(12) United States Patent
Hayden

(10) Patent No.: X3816
(45) Date of Patent: Feb. 11, 1824

(54) TEETH, PREVENTING DECAY

(76) Inventor: m Horace H. Hayden

United States Patent Patent No.: X3816

Horace H. Hayden
Letters Patent

The Schedule referred to in these Letters Patent, and making part of the same, containing a description in the words of the said Horace H. Hayden himself, of his improvement being a remedy or preventive for the caries or decay of the human teeth, and the diseases consequent thereto, and to the human mouth.

---

The pyroligneous acid, and pyroligneous or empyreumatic oil, (tar or balsam) obtained from the distillation of wood (or other vegetable substances of whatever kind and even from common wood soot) is, when properly used or applied, a sovereign preventive or remedy against the caries or decay of the teeth, and the diseases consequent thereto, and to the human mouth. –
This has been satisfactorily proven in numerous instances during the period of more than two years in which time I have been in the daily habit of using them for that purpose – The pyroligneous acid, and pyroligneous or empyreumatic oil (tar or balsam) it is well known, are obtained by the distillation of wood of any kind, or other vegetable substances and even wood soot, in a close vessel, and to which heat is externally applied, until the wood, or other vegetable matter contained in such vessel, is reduced to a perfect carbon, and yields no farther product. The specific properties and uses of the above preparation or mixture, viz. the pyroligneous acid, and pyroligneous oil (tar or balsam) however differently modified is, that, by the highly antiseptic qualities which they possess they counteract the caries in the teeth allay the pain and irratability in the vessels of the tooth – Teeth, lessen the morbid sensibilities, and arouse and restore to a healthy tone the energies of the surrounding parts, when in a state of disease –
The above pyroligneous acid and oil then, when used for the purposes specified, either separately or combined, are not only susceptible of, but must necessarily be differently modified, as circumstances may require – hence when applied with a view to counteract a deep & extensive caries or decay in a tooth or teeth, and to destroy or allay the great sensibility and pain of the parts, I apply the pyroligneous oil with a very small proportion of the acid, aromatized with the oil of cinnamon, cloves, or other essential oils: to the
cavity of the diseased tooth or teeth, on a deposit of cotton or lint; and this is re-
-peated several times as occasion may require to produce the desired effect —

When applied to correct or counteract a general disposition in the teeth to
decay, for scorbutic, ulcerated, or otherwise diseased state of the gums and
mouth, I use a saturated solution of the pyroligneous or empyreumatic oil
and pyroligneous acid to which is added three or more parts of water to one
of the pyroligneous mixture. With this mixture the mouth is to be gargled
twice or thrice each day, or as occasion may require —

These modifications or mixtures, I denominate the Odontalgic balsam, or
odontalgic and antiscorbutic elixir for the teeth and gums —

In fine, what I claim as my peculiar discovery, improvement, or invention
and for which I claim a patent is the exclusive privilege of using and ven-
-ding, or causing to be used the empyreumatic or pyroligneous oil (tar or
balsam) and acid obtained in whatsoever mode or manner, by the distillation
of wood or other vegetable substances, and even wood soot, which oil and acid
when properly modified, proportioned, or applied, is used for the purpose of
arresting or counteracting the caries or decay in human teeth, and the dis-
-eases consequent thereto and to the human teeth.

Witnesses

Henry Yearley

Nicholas Hand

Horace H. Hayden

Exd

M.G.C.